Feb. 16, 1932.　　F. F. SCHWANBECK ET AL　　1,845,890
BAIT
Filed March 27, 1931
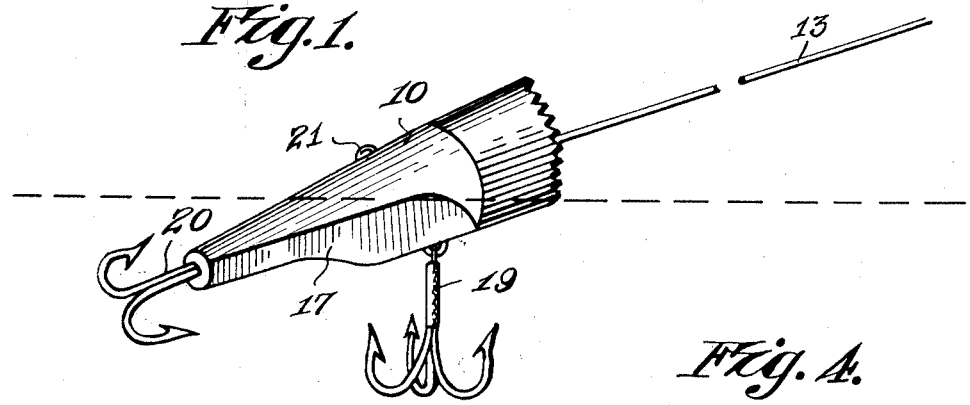
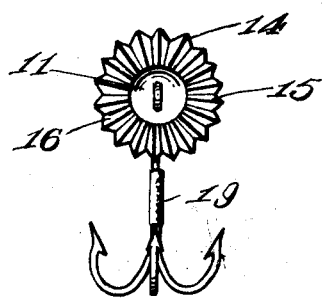
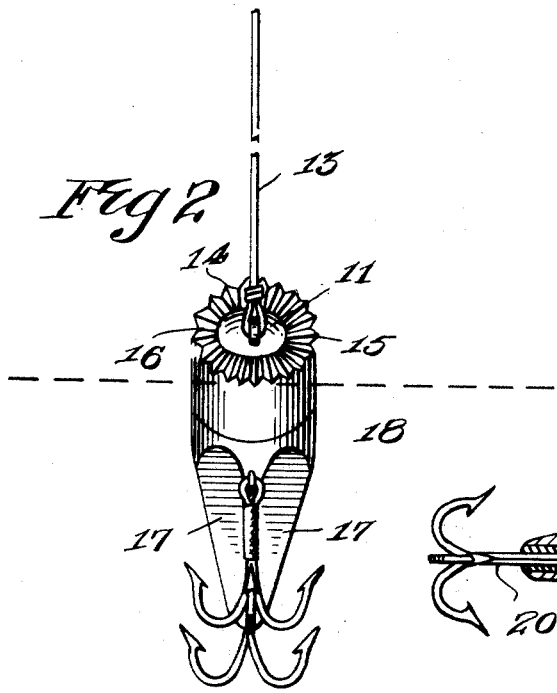
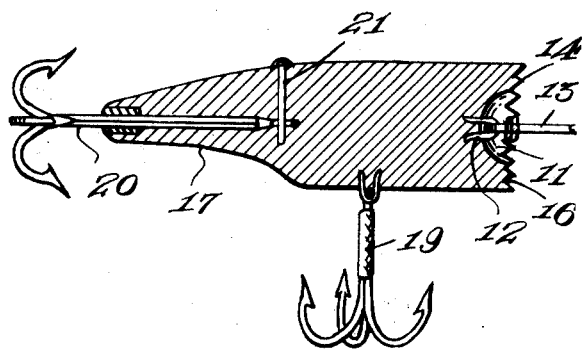
Frank F. Schwanbeck,
Francis P. Sumner,
INVENTOR Patented Feb. 16, 1932

1,845,890

UNITED STATES PATENT OFFICE

FRANK F. SCHWANBECK AND FRANCIS P. SUMNER, OF DES PLAINES, ILLINOIS

BAIT

Application filed March 27, 1931. Serial No. 525,822.

This invention relates to artificial minnows or lure of the surface type and which embodies among other characteristics a submerged portion shaped to simulate the belly of a minnow and to balance the lure while being drawn through the water.

An additional object of the invention consists of a concaved portion within the line attaching end thereof to obscure said connection from view and to deflect air currents therefrom.

More specifically stated the body of the bait is provided with a multiplicity of ridges with intervening recesses in communication with the concaved portion for directing the air currents in different directions whereby the desired wiggling and wobbling action will be imparted to the lure for the purpose intended.

With the above and other objects in view, the invention further consists of the following novel features and details of construction to be hereinafter more fully described, illustrated in the accompanying drawings, and pointed out in the appended claims.

In the drawings:

Figure 1 is a perspective view of the invention in active position.

Figure 2 is a bottom plan view of the invention.

Figure 3 is a longitudinal sectional view taken through the invention.

Figure 4 is a front end elevation of the invention.

Referring to the drawings in detail wherein like characters of reference denote corresponding parts, the reference character 10 indicates generally the body of the artificial bait or lure which may be composed of wood, cork or other buoyant material or of hollow metallic formation and which as shown is circular in cross section at its respective ends and of different sizes. The forward or larger end of the body is provided with a concaved pocket 11 within which a staple, screw eye or other form of fastening, such as indicated at 12, may be located and embedded within the body of the bait to attach one end of a fishing line or cord 13 thereto and to provide a swivel connection therefor. The peripheral edge of the concavity or concaved portion 11 is spaced from the outer peripheral edge of the body, substantially as illustrated in Figures 2 and 4 of the drawings. The mentioned space between the peripheral edges of the body and concavity is shaped to provide a multiplicity of radially projecting ridges 14 defined by oppositely projecting facets 15 having intervening recesses 16.

The body portion of the bait beneath the surface of the water is provided with facets 17 oppositely inclined laterally thereof and extending throughout the major portion of the length of the body are separated at their lowermost edges by a flat ridge 18. The particular shape of the under or submerged portion of the body is adapted to simulate or otherwise imitate the belly side of a minnow. Hooks 19 and 20 of the snagging or triple type are swivelly and fixedly connected to the ridge 18 and the smaller end of the body respectively. The shank portion for the immovable or fixedly connected hook 20 is extended well within and longitudinally of the body to accommodate the shank of a cross pin 21 whereby the hook 20 will be held against accidental displacement. The head of the cross pin 21, reposing against the upper or back side of the artificial minnow is adapted to represent a fish eye to render the lure more attractive to bass and other game fish.

The concavity 11, facets 15 and recesses 16 will cooperate in the deflecting of air currents in different directions from the body of the lure to impart the wiggling or wobbling motions to the body of the bait found to be essential in the attracting of game fish. The forward or larger end of the body is cut off at an inclination or bias with relation to the longitudinal or median center of the body whereby the air currents traveling across the surface of the water will have greater effect upon the bait to impart the mentioned movements thereto whereby the bait in and of itself will not have to be dragged or otherwise towed at an unnatural rate of speed to produce the life like wiggling or wobbling motions to the artificial minnow.

The invention is susceptible of various changes in its form, proportions and minor details of construction and the right is herein reserved to make such changes as properly fall within the scope of the appended claims.

Having described the invention, what is claimed is:

1. An artificial fish bait comprising a body having facets extended longitudinally of the body upon the submerged portion thereof, the portion of the body above the surface of the water having a concavity spaced peripherally thereof from the marginal edges of the body, and ridges arranged between said peripheries and upon said body having intervening recesses in communication with said concavity for deflecting air currents in different directions from the body to impart life like movements thereto.

2. An artificial fish bait comprising a body having oppositely inclined facets arranged longitudinally thereof and upon that side to be wholly submerged, hooks arranged at intervals upon the submerged portion, the portion of said body above the surface of the water having a centrally arranged concavity spaced peripherally thereof from the immediate marginal edge of the body, and ridges having oppositely inclined meeting facets and intervening recesses disposed between the mentioned peripheries for communication with said concavity for directing air currents in different directions from the latter.

In testimony whereof we affix our signatures.

FRANK F. SCHWANBECK.
FRANCIS P. SUMNER.